May 9, 1961
K. L. HERRMANN
2,983,264
CAM ENGINE VALVE MEANS
Filed June 17, 1960
5 Sheets-Sheet 1
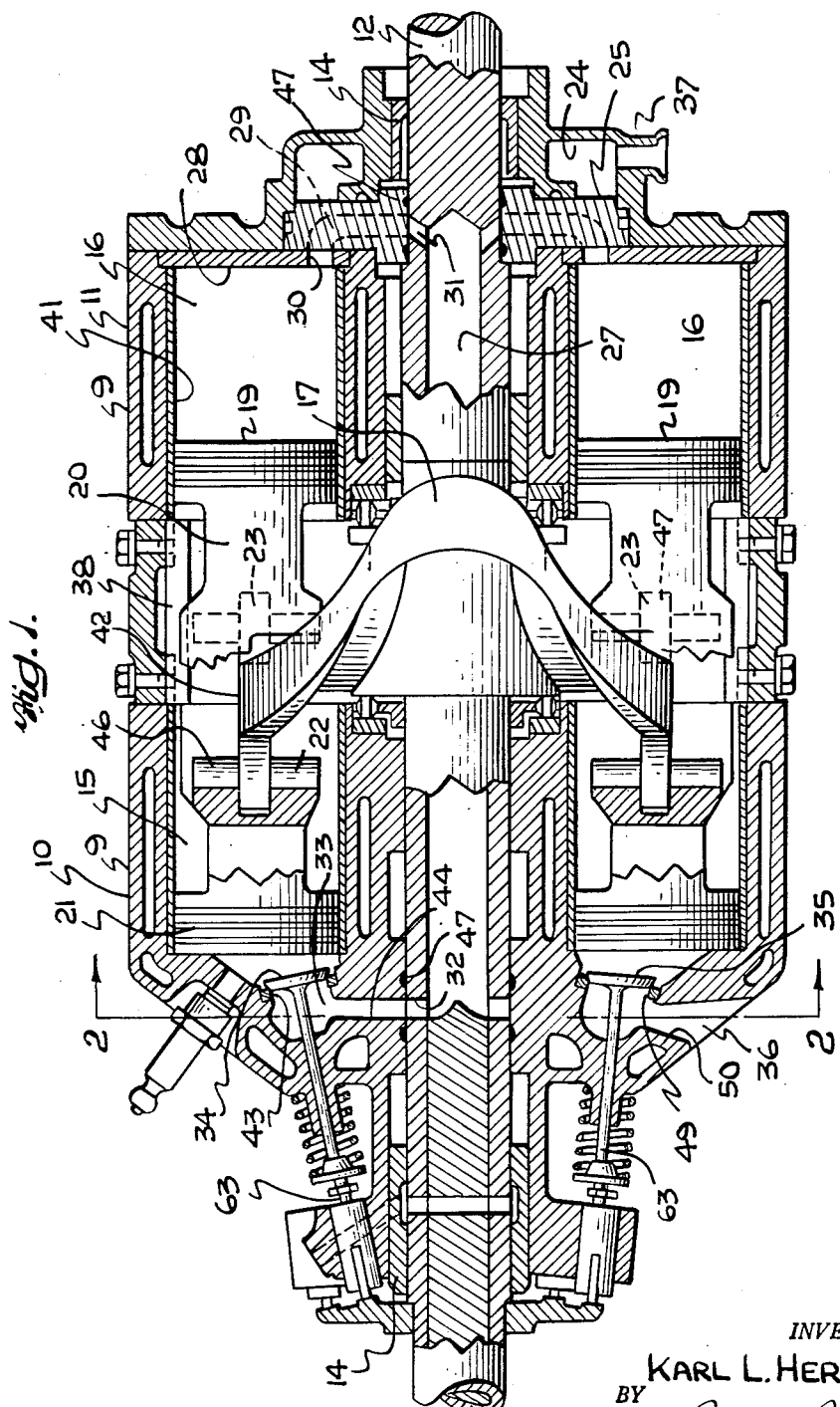
INVENTOR.
KARL L. HERRMANN
BY Peter J. Patane
HIS ATTORNEY

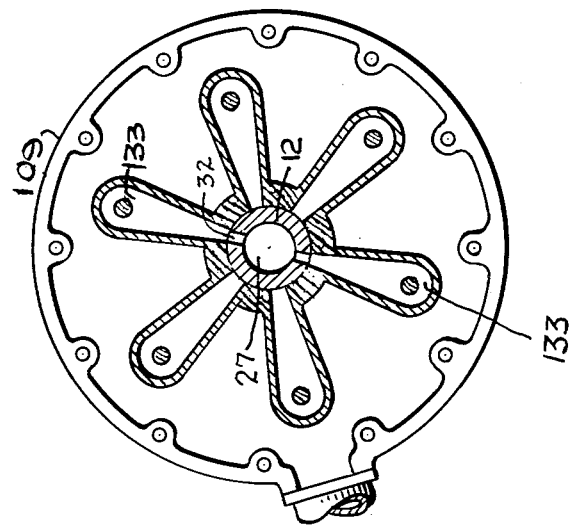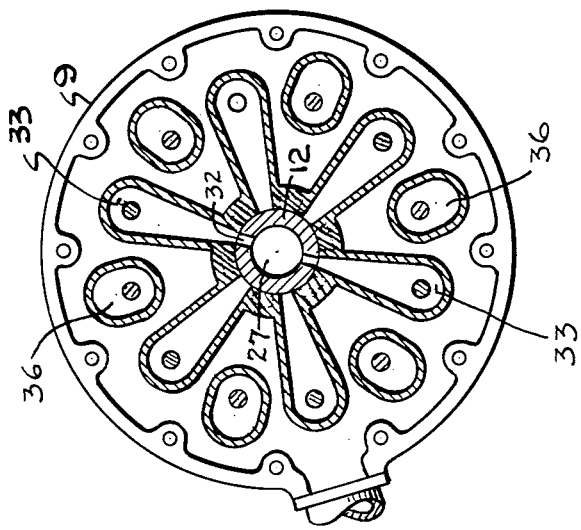

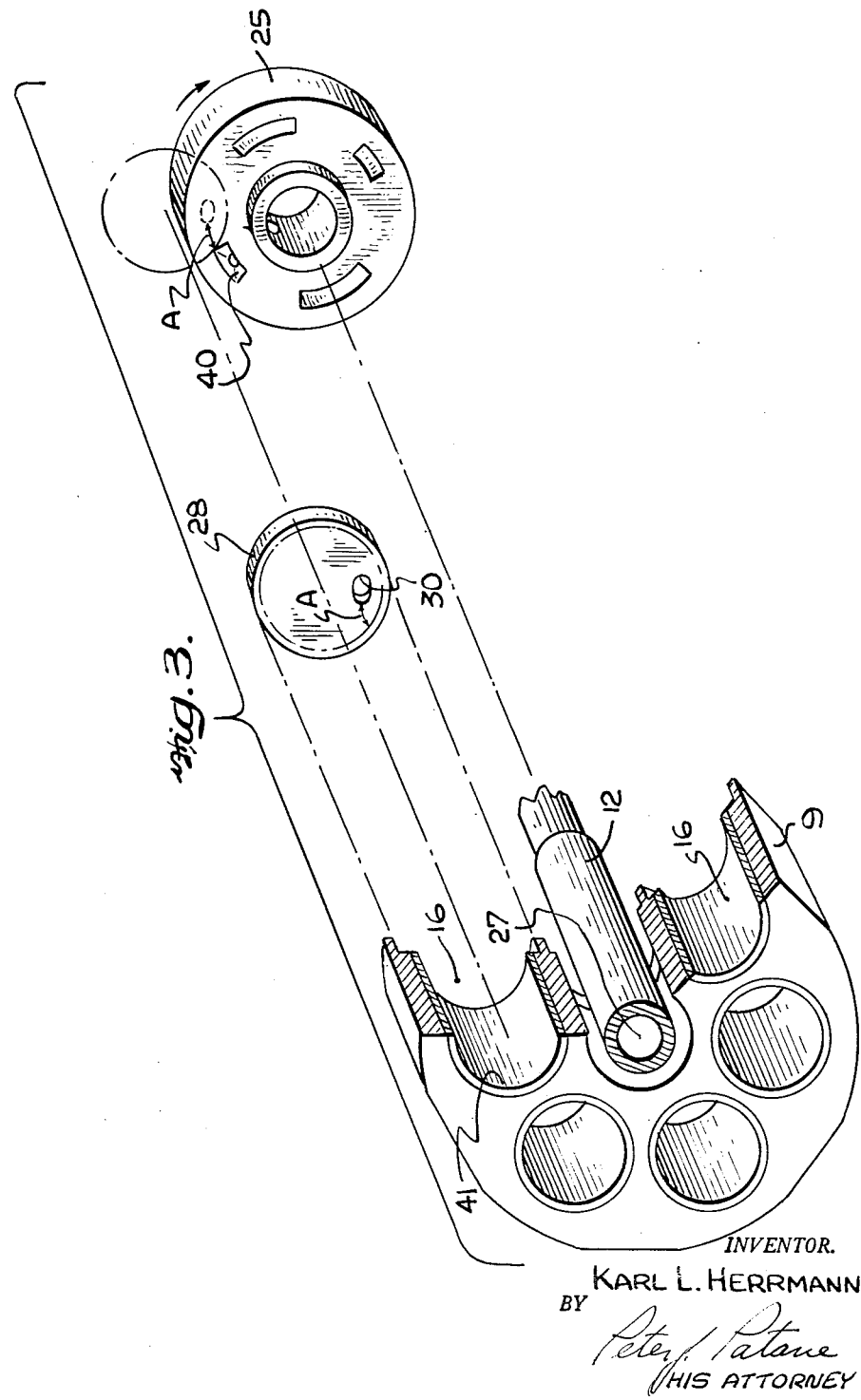

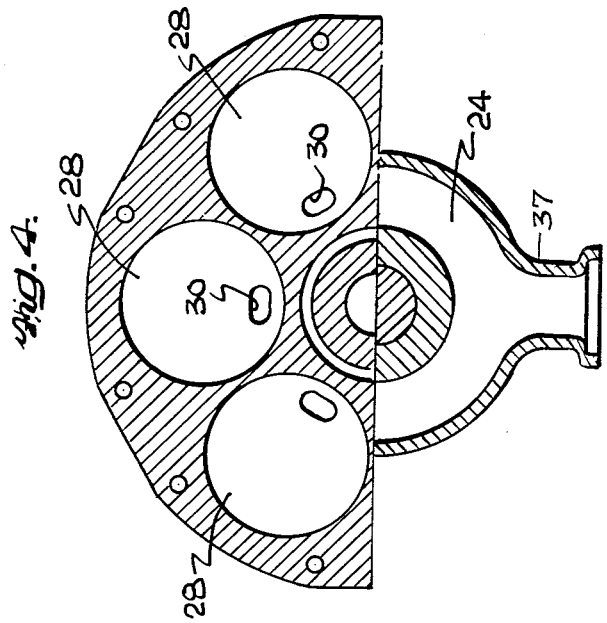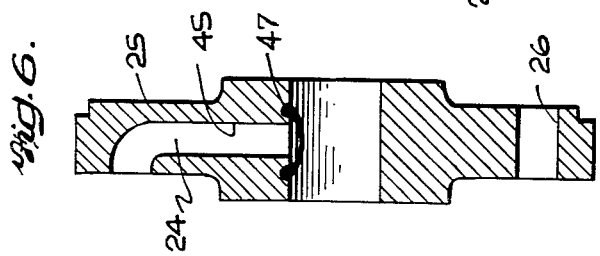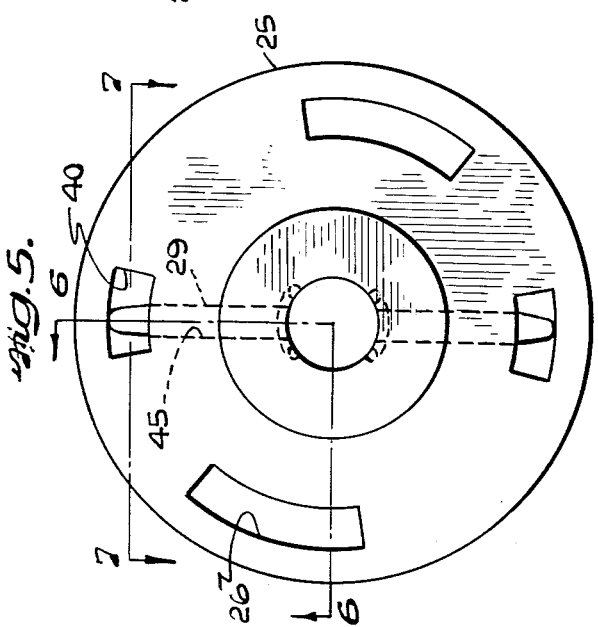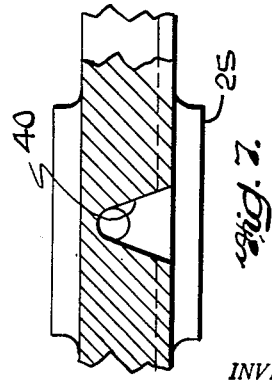

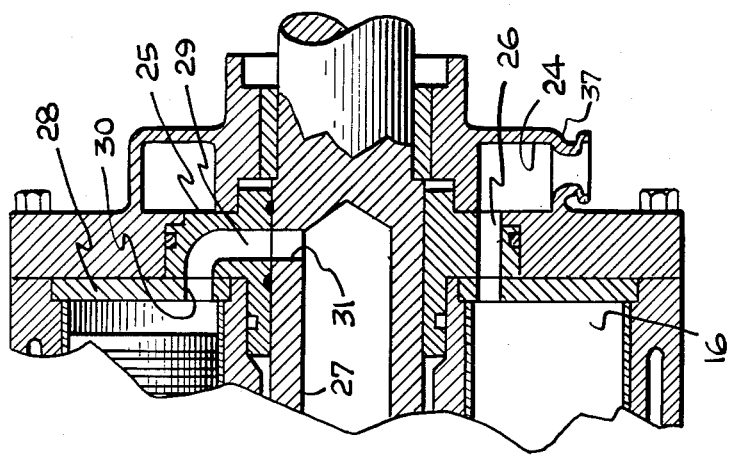
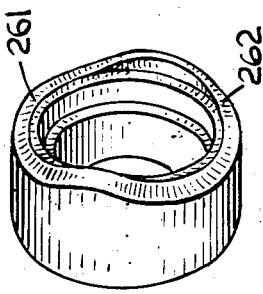
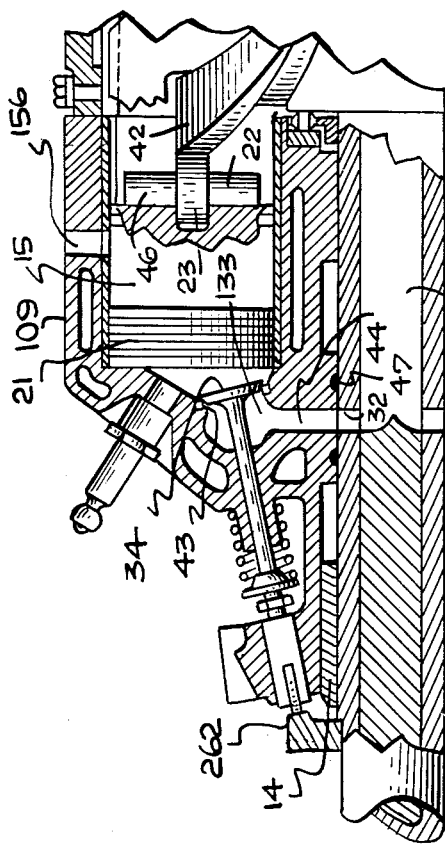
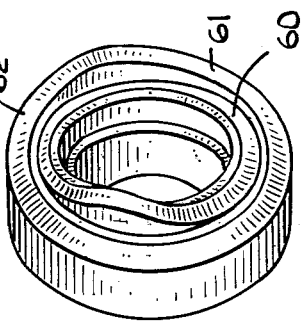

United States Patent Office 2,983,264
Patented May 9, 1961

2,983,264

CAM ENGINE VALVE MEANS

Karl L. Herrmann, 1405 Air Way, Glendale, Calif.

Filed June 17, 1960, Ser. No. 36,921

6 Claims. (Cl. 123—58)

This invention relates to internal combustion engines and more particularly to novel valve means for the improved control of the flow of the air-fuel mixture. It is an object of the present invention to increase the efficiency of such engines.

Internal combustion cam engines are commonly of the barrel type, that is, an engine in which cylinders at both ends of the engine are located parallel to and about a central shaft, having double-ended reciprocable pistons within the cylinders. A cam is mounted on the central shaft and the periphery of such cam extends into the body of said pistons midway between the ends thereof. The thrust is transmitted from the pistons to the cam followers (mounted in the pistons) and from the cam to the main shaft. Power may be taken off the main shaft in any conventional manner. Such an engine is shown and described in my Patent No. 2,243,817.

The cylinders at one end of the engine are utilized to pressurize or supercharge the air-fuel mixture which is then fed to the combustion or power pistons at the other end of the engine. As described in detail in my copending patent application Serial No. 549,965, now Patent No. 2,966,899, the means for transmitting the mixture between the cylinders comprises a rotary valve member secured to the shaft for placing the supercharger cylinders in communication with a central chamber formed in the shaft. The shaft chamber is, in turn, in communication with the combustion cylinders.

The mixture in the shaft chamber is under pressure at all times. Since at the beginning of the compression stroke in the supercharger cylinder, the pressure therein is lower than the pressure in the shaft chamber, there has been a tendency for the mixture in the shaft chamber to flow in reverse or back up into the supercharger cylinders. It is a feature of my invention to provide plates for restricting the passage between the supercharger cylinders and the shaft chamber until the pressure in the supercharger cylinders has risen substantially to minimize the reverse flow of the mixture from the shaft chamber to the supercharger cylinders.

It has been the usual practice previously to construct internal combustion cam engines for either two cycle or four cycle operation. Another feature of the present invention provides an improved tappet valve and port arrangement whereby the manufacturer may utilize the same basic parts, with slight alterations, to provide engines for two cycle or four cycle operation, as the consumer demand may warrant. Thus, the number of parts which need be kept in stock is reduced.

Tappet valves are usually utilized to provide a four cycle engine. For two cycle operation, I have found, however, that by using only the tappet inlet valve at the top of the cylinder in combination with an exhaust port at the bottom of the cylinder and supplying the air-fuel charges from a chamber in the shaft to the inlet passage controlled by the inlet tappet valve that the efficiency of the engine is increased.

The foregoing and other objects of my invention, the principles of my invention, and the best modes in which I have contemplated applying such principles will more fully appear from the following description and accompanying drawings in illustration thereof.

In the drawings,

Fig. 1 is a longitudinal sectional view of a cam engine constructed for four cycle operation;

Fig. 2 is a sectional view taken along the line 2—2 in Fig. 1, looking in the direction of the arrows;

Fig. 3 is a partial exploded perspective view showing the relationship between the rotary valve and a plate which is placed at the end of each compression cylinder;

Fig. 4 is a sectional view, the upper half of which shows the plates in the compression cylinders and the lower half of which shows the inlet arrangement to the compression cylinders;

Fig. 5 is an elevational view of a rotary valve adapted for four cycle operation;

Figs. 6 and 7 are sectional views taken along the lines 6—6 and 7—7, respectively, in Fig. 5, looking in the direction of the arrows;

Fig. 8 is a partial longitudinal sectional view of the compression end of the engine;

Fig. 9 is a perspective view of the valve operating cam showing the cam surfaces for operating the intake and exhaust valves for four cycle operation;

Fig. 10 is a partial longitudinal sectional view of a modified engine constructed for two cycle operation but generally similar to the engine illustrated by Fig. 1;

Fig. 11 is a sectional view similar to Fig. 2 for the embodiment illustrated in Fig. 10; and Fig. 12 is a view similar to Fig. 9 but illustrating a modified valve operating cam for two cycle operation.

Referring to the drawings, there is disclosed a cam engine having a housing 9 defining a power end 10 and a supercharger end 11. A drive shaft 12 mounted in suitable journals 14 extends through both halves of said engine. Power or combustion cylinders 15 and supercharger or compression cylinders 16 are equally spaced about the drive shaft 12 and are parallel thereto. Mounted on the drive shaft 12, approximately midway between the ends thereof, is a cam 17 having a generally T-shaped cross section, the peripheral portion of which extends into the midportion of double-ended pistons 20. The pistons 20 have end portions 21 and 19 which reciprocate in the cylinders 15 and 16, respectively, and rotate the drive shaft 12 through cam followers 22, 23 and cam 17.

The details of the operation of a cam engine are set forth in my Patent No. 2,243,817. Briefly, however, air-fuel charges are sequentially fed into the supercharger cylinders through passages 26 (Figs. 5 and 8) in a rotary valve member 25. The passages 26 are in communication with an inlet manifold 24 of a fuel intake structure 37 to which is supplied an air-fuel mixture from a suitable carburetor (not shown). After compression in the cylinders 16 the air-fuel charges pass through the rotary valve member 25 by way of other passages 29 and through ports 31 (the latter being circular in cross-section) in the shaft 12, into a chamber 27 located centrally in the shaft 12.

Circular discs or plates 28 having central openings 30 are provided in the end of each compression cylinder 16. Ports 32 in the shaft 12 permit the charges to sequentially flow from the chamber 27 into the combustion cylinders 15 through inlet passages 33 in the housing controlled by conventional inlet tappet valves 34. The burning of such charges in the cylinders 15 forces the followers of pistons 20 against the cam 17, thereby rotating the latter. The reciprocal movement of the pistons 20 caused by the burning of the fuel simultaneously pressurizes the charge which has been admitted to the compression cylinders 16.

After combustion, the gases are exhausted through exhaust passages 36 in the housing, the passages 36 being controlled by conventional exhaust tappet valves 35. It will be noted that in accordance with the disclosure of my prior Patent No. 2,243,817 both inlet passages 33 and outlet passages 36 are disposed at the top of the combustion cylinders or, as viewed in Fig. 1, at the extreme left.

The air-fuel mixture within the chamber 27 is pressurized and there has been a tendency, heretofore, for it to flow in reverse or back up into the compression cylinders 16, during the initial portions of the compression strokes of the pistons 19 in the compression cylinders 16. To prevent these reverse flows of air-fuel charges, the circular stationary plates 28 are secured to the housing at the top or the right-hand side (as viewed in Fig. 1) of the cylinders 16.

The central openings 30 in the plates 28 are radially aligned with respect to the mouths 40 (Fig. 5) of the passages 29 in the rotary valve 25. As illustrated in Fig. 3, the openings 30 and the mouths 40 lie in parallel annuli which are coaxial. The openings 30 lie radially inwardly (with respect to the longitudinal axis of the engine) of the center of the circular plates 28 but are spaced from the wall of the liner 41 partially defining the cylinders 16 by the arcuate distances A. The rotary valve 25 is positioned with respect to the piston ends 19 so that when the piston ends 19 are about to start the compression stroke within the cylinder 16, the leading or right-hand edge of the mouth 40 has rotated to a position, illustrated by Fig. 3, where it is about to enter the area described by the end of one of the cylinders 16. Were it not for the plates 28 of the present invention, the cylinder 16 would start to be in communication with the shaft chamber 27 and because the pressures within the cylinders 16 (at the start of the compression strokes) are lower than the pressure of the air-fuel mixture in the chamber 27, there would be a tendency for the air-fuel mixture to flow in reverse, into the cylinders 16. The present invention delays communication between the cylinders 16 and the chamber 27 until the rotary valve 25 has rotated through the arcuate distances A during which time the piston ends 19 compress the air-fuel charge sufficiently to minimize the tendency of reverse flow.

As illustrated by Figs. 5, 7 and 8, the passage 29, in the rotary valve 25, comprises the flared mouth 40 and an elongated, circular, in cross-section, conduit 45 in communication with ports 31. At the power end of the shaft 12, the inlet passages 33 for supplying air-fuel charges to the combustion cylinders 15 comprise a port 43 (opened and closed by the tappet valve 34) and an elongated conduit 44 leading thereto having the portion adjacent the shaft 12 formed, also of circular cross-section and in communication with ports 32. The exhaust passages 36 are formed similar to the inlet passage 33 and comprise an exhaust port 49 (controlled by tappet valves 35) and an exhaust conduit 50 leading to a manifold (not illustrated).

Since the ports 31 and 32 which place the shaft chamber 27 in communication with the passage 29 (in the rotary valve 25) and the inlet passage 33, respectively, are all formed as elongated, circular, in cross-section, conduits, the use of such circular conduits 45 and 44 reduces the leakage surfaces and makes possible the use of substantially smaller circular seals 47, thus resulting in less leakage in the air-fuel charges.

In four cycle operation of the engine, the tappet valves 34 and 35 are opened and closed, as controlled by the cam surfaces 60 and 61 of a cam 62 (Fig. 9) acting on the valve stems 63. The lobes on the cam surfaces 60 and 61 are such that they open and close the valves 34 and 35, respectively, once during four reciprocations of the associated piston 21. The timing of the spark plug is such that the air-fuel charges in the combustion cylinders 15 are ignited after suitable compression thereof by the second stroke of piston reciprocation.

From the foregoing construction it is seen that during the time interval that the combustion end 19 completes the four reciprocations necessary for one complete four stroke power cycle, the compression end completes four reciprocations, also, but discharges a charge at the end of two reciprocations into the shaft chamber 27 or a total of two charges during the same time interval. For each two discharges of air-fuel charges into the shaft chamber 27, the inlet tappet valve opens only once. The relative sizes of the various parts, i.e., the piston 19, the cylinder 16, the volume of chamber 27, the passages 29, 31, 32 and 33 are such that a pressure is attained and maintained in the chamber 27 sufficient to cause a volume equivalent to two charges of air-fuel, as discharged by the compression cylinders 16, to enter the combustion cylinders 15 when the valve 34 is opened by the cam surface 60.

The engines and components described so far are for four cycle operation but they may be modified for two cycle operation.

When an engine for two cycle operation is desired, the housing 109 is utilized, Figs. 10 and 11, which replaces housing 9. The exhaust tappet valves 35 and their associated parts and passages are omitted, in this instance, but provision is made for exhausting through the side wall of the cylinders through ports 156. The ports 156 are located adjacent the piston 21 when the latter is at the end of its rightward movement (Fig. 10). The cam 62 is replaced by cam 262, Fig. 12, having only one cam surface 261 for controlling the inlet tappet valves 34. The one cam surface 261 for two cycle operation, however, has two lobes disposed opposite each other for opening the inlet valves 34 twice as many times as compared to the cam 62 for four cycle operation. The timing of the spark plug is made such that the spark plug is energized every time the piston end 21 is near the end of its compression stroke. The engine may then be operated in the standard two cycle manner with intake of air-fuel charges being made through inlet passage 133 and exhaust through ports 156.

In the two cycle operation, the air-fuel charges are admitted to the cylinder 15 when the piston is near the end of its power stroke, forcing the burned gases out the exhaust port 156, which is open at this time. Thereafter, the port 156 is closed by the piston end 21 moving to the left and the air-fuel mixture compressed and burned.

In the appended claims the term "four cycle operation" is to be understood as defining the internal combustion engine cycles in which during four reciprocable movements of a piston within a cylinder a fuel is burned to produce useful work. An example of such a cycle is one in which an air-fuel charge is first compressed by the piston, ignited (by suitable means) and burned to expand in volume for a second movement of the piston, a third movement of the piston exhausts the gas from the cylinder, and in a fourth movement of the piston the cylinder takes in a new air-fuel charge, and the cycle is repeated.

Likewise, in the appended claims the term "two cycle operation" is to be understood as defining the internal combustion engine cycles in which during two reciprocable movements of a piston within a cylinder a fuel is burned to produce useful work. An example of such a cycle is one in which a first movement of the piston compresses an air-fuel charge which is then ignited (by suitable means) to burn and expand causing a second movement of the piston at the end of which the spent gases are exhausted and a new air-fuel charge is taken in and the cycle repeated.

Having described this invention, I claim:

1. In an internal combustion engine having a rotatable shaft, a housing defining a series of combustion cylinders and a series of compression cylinders arranged with their axes parallel to said shaft and grouped around said shaft, said shaft including a cam, said shaft having a pressure chamber therein, a fuel flow control member for placing said compression chamber in communication with said chamber, means at the end of said compression cylinders adjacent said flow control member, said means restricting the flow of the air-fuel mixture between the compression cylinder and the chamber until the pressure within the compression cylinder rises a predetermined amount.

2. In an internal combustion engine having a rotatable shaft, a housing defining a series of combustion cylinders and a series of compression cylinders arranged with their axes parallel to said shaft and grouped around said shaft, said shaft including a cam, said shaft having a chamber therein and a port at each end, a fuel flow control member for placing said compression chamber in communication with said chamber, a plate having restricting ports at the end of the compression cylinders adjacent said flow control member, said plate restricting communication between said flow control member and said compression chambers for preventing the flow of the mixture within the shaft chamber into the compression cylinders.

3. In an internal combustion engine having a rotatable shaft, a housing defining a series of combustion cylinders and a series of compression cylinders arranged with their axes parallel to said shaft and grouped around said shaft, said shaft including a cam, means for placing said compression cylinder in communication with said combustion chamber, said means including a fuel flow control member, a conduit in fluid communication with said fuel flow control means and said combustion chamber, restricting means in fluid communication with said fuel flow control member and said compression cylinder, said restricting means restricting the flow of the air-fuel charge into said conduit until the pressure in the compression cylinder rises a predetermined amount.

4. In a four cycle combustion engine having a rotatable shaft, a housing defining a series of combustion chambers and a series of compression chambers arranged with their axes parallel to said shaft and grouped around said shaft, said shaft including a cam, said shaft having a pressure chamber therein and a port at the compression chamber end thereof and a port at the combustion chamber end thereof, a fuel flow control member for placing said compression chamber in communication with the shaft chamber through one of said ports, an inlet passage means for placing said combustion chamber in communication with the shaft chamber through the other of said ports, pistons within said compression and combustion chambers; said fuel flow control valve having passage means for discharging into the shaft chamber the compressed air-fuel charge after two reciprocations of the compression piston, the port at the combustion chamber end of the shaft pressure chamber placing said combustion chamber in communication with said compression chamber after four reciprocations of the combustion piston, said compression chambers, compression pistons, ports, the passage means in said fuel flow control member, and shaft chamber being proportioned so that a volume equivalent to that of two air-fuel charges discharged by one compression chamber at one time enters one combustion chamber at one time.

5. In a two cycle combustion engine having a rotatable shaft, a housing defining a series of combustion chambers and a series of compression chambers arranged with their axes parallel to said shaft and grouped around said shaft, said shaft including a cam, said shaft having a pressure chamber therein, means for placing said compression chamber in communication with said pressure chamber, inlet means at one end of each of said combustion chambers for placing said combustion chambers in communication with said pressure chamber, and outlet means at the other end of each of said combustion chambers in said housing for exhausting the spent gases from said combustion chambers.

6. In a four cycle combustion engine having a rotatable shaft, a housing defining a series of combustion chambers and a series of compression chambers arranged with their axes parallel to said shaft and grouped around said shaft, said shaft including a cam, said shaft having a pressure chamber therein and a port at the compression chamber end thereof and a port at the combustion chamber end thereof, a fuel flow control member for placing said compression chamber in communication with the shaft chamber through one of said ports, an inlet passage for placing said combustion chamber in communication with the shaft chamber through the other of said ports, said fuel flow control valve having passage means for discharging into the shaft chamber the compressed air-fuel charge after two reciprocations of the compression piston; said compression chambers, compression piston, ports, passage means and shaft chamber being proportioned so that a pressure is maintained in the shaft chamber sufficient for a volume equivalent to that of two air-fuel charges discharged by the compression chambers to enter each combustion chamber at one time.

References Cited in the file of this patent
UNITED STATES PATENTS

| | | |
|---|---|---|
| Re. 17,273 | Michell | Apr. 16, 1929 |
| 1,610,060 | Lind | Dec. 7, 1926 |
| 1,802,902 | Brau | Apr. 28, 1931 |
| 2,030,732 | Angel | Feb. 11, 1936 |